United States Patent

[11] 3,609,510

[72] Inventors Alexandr Mikhailovich Berkovsky
 Nizhne-Krasnoselskaya ulitsa, 45, kv. 244, Moscow;
 Veniamin Efimovich Turetsky, Nizhne-Krasnoselskaya ulitsa, 45, kv. 90, Moscow;
 Khaim Shlemovich Grois, Lesnoi prosekt, 15, kv. 33, Leningrad; Moisha Gershkovich Shekhtman, ulitsa Nekrasova, 60, kv. 128, Leningrad, all of U.S.S.R.
[21] Appl. No. 770,024
[22] Filed Oct. 23, 1968
[45] Patented Sept. 28, 1971

[54] RECTIFYING BRIDGE EMPLOYED FOR DC ELECTRIC TRANSMISSION LINE
 2 Claims, 1 Drawing Fig.
[52] U.S. Cl. .................................................. 321/8,
 317/103, 321/27
[51] Int. Cl. .................................................. H02m 7/00
[50] Field of Search ........................................... 315/146;
 307/146; 317/103, 117; 321/8, 27, 32

[56] References Cited
 UNITED STATES PATENTS
 2,090,517 8/1937 Moyer .......................... 317/103 X OTHER REFERENCES
 Conference on High Voltage DC Transmission, " Design and Layout of Convertor Stations, Harmonic Filters and Reactive Compensation Plant," pp. 403– 406, TK 3111.c6 Part I, 19– 23 Sept. 1966
 Conference on High Voltage DC Transmission, " Layouts of Converter Stations," pp. 384– 386, TK 3111.c6 Part I, 19– 23 Sept. 1966
 Direct Current, " Initial Period of Operation of the DC Transmission Line Between Volgograd and Donbass," Vol. 11, No. 4, pp. 142– 144, Nov. 1966.

Primary Examiner—William H. Beha, Jr.
Attorney—Waters, Roditi, Schwartz & Nissen ABSTRACT: A rectifying bridge for a high voltage DC power transmission system comprises a plurality of rectifiers connected in two groups in each AC phase in a respective bridge arm thereof. A platform supports the rectifiers in two rows and the platform is electrically connected to the lower potential bridge pole so as to be at a potential between the higher potential bridge pole and earth potential. The rectifiers at the ends of both rows are electrically connected to the higher bridge pole, while the intermediate rectifiers in each row, between the endmost rectifiers, are electrically connected to the platform. The spacing between adjacent rectifiers is at least as great as the minimum spacing to prevent discharge therebetween.

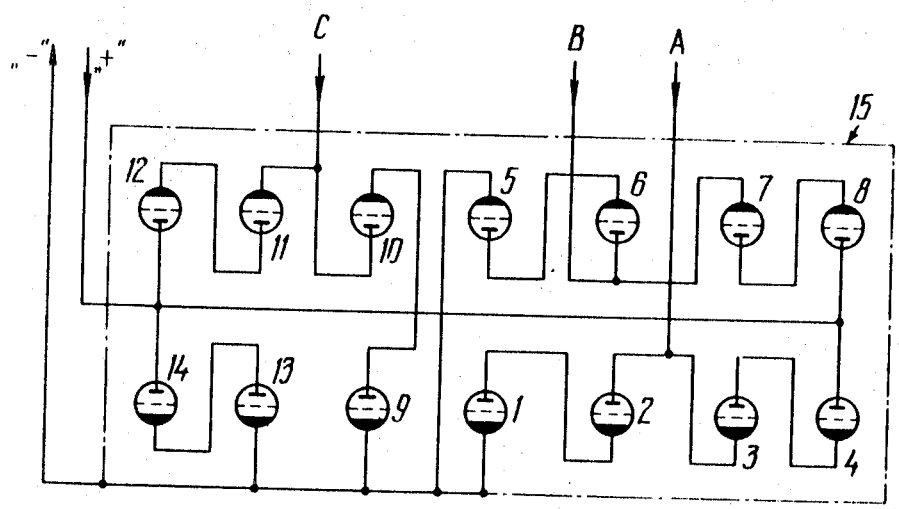

RECTIFYING BRIDGE EMPLOYED FOR DC ELECTRIC TRANSMISSION LINE

The present invention relates to rectifying bridges employed for H.V. direct current power transmission lines, and more particularly to rectifying bridges featuring a double-row arrangement of mercury-arc rectifiers.

Known in the art are rectifying bridges for DC power transmission lines with a double-row arrangement of rectifiers accommodated on a platform, the latter being connected to the lower potential bridge pole. The platform thus acquires an intermediate potential between the higher potential bridge pole and the earth.

The rectifying bridges mentioned hereinabove are employed for DC power transmission lines of relatively low voltage of up to 500 kv.

The conventional rectifying bridges do not take into account the values of voltages available across the cathodes or anodes of neighboring rectifiers since the above-mentioned voltages are of relatively low values and therefore the spacing between the rectifiers is determined solely by the servicing requirements thereof.

For rectifying bridges of 800 kv. and more, the sizes of passageways provided between the rectifiers involved are determined by the value of the voltages available across the cathodes or anodes of neighboring rectifiers.

Maximum air gaps made between the cathodes and anodes of adjacent rectifiers, the anodes or cathodes of said rectifiers being connected to the bridge pole whose potential is higher with respect to the platform potential.

The employment of the known bridges for the DC power transmission line with a voltage of 800 kv. and higher is not efficient and results in considerably increased length of the rectifying bridge platform and, consequently, of the whole building. For example, when resorting to an eight-bridge connection of the DC power transmission line with a voltage of 800 kv. with due account of the conventional spacing between the rectifiers, the length of the building should be increased by 50 meters.

It is a primary object of the present invention to eliminate the above-mentioned disadvantage.

The main object of the present invention is to provide a rectifying bridge for H.V. direct-current power transmission lines which can be housed in a building of smaller size. The smaller size of the building results from employing a particular arrangement of the said rows of rectifiers with the distances between the anodes or cathodes of immediately adjacent rectifiers not exceeding the air clearances required in the basis of maximum possible overvoltage between said rectifiers electrically connected to the lower bridge pole.

The above-mentioned distance may be assumed as a spacing to be provided when locating the rectifiers, if said distance is less than that required for servicing the rectifiers.

According to the present invention there is provided a rectifying bridge arrangement for a DC power transmission, wherein rectifiers are located in two rows on a platform electrically connected to the lower potential bridge pole having an intermediate potential with respect to the potential between the earth and the higher potential bridge pole, the rectifiers of different phases having cathodes or anodes electrically connected to the low potential bridge pole and electrically connected to said platform, being arranged close to each other, whereas the rectifiers having the higher potential cathodes or anodes are connected electrically to the high potential bridge pole and are separated from each other and located at the ends of both rows. At least two series rectifiers may be connected to the arm of each phase of the rectifier bridge.

One or several rectifiers may be connected to the arm of each phase of the rectifying bridge.

The rectifying bridge for DC power transmission lines according to the present invention provides for the possibility of considerably decreasing the length of the platform and thereby, the length of the whole building. The present invention may be employed for DC power transmission lines with a voltage of 800 kv. and higher.

The invention will be described hereinbelow by way of an exemplary embodiment of a rectifying bridge for a DC power transmission line with due reference to the accompanying drawing, wherein two rectifiers are connected in series to each arm of the bridge.

The bridge circuit incorporates 12 operating rectifiers 1 to 12 and two rectifiers 13 and 14 adapted for shunting the rectifying bridge in case of abnormal operation of one of the rectifiers 1 to 12.

Two operating rectifiers are connected to each arm of the bridge. The operating rectifiers 1 to 4, 5 to 8, and 9 to 12, are respectively connected to the three phases A, B and C on the AC side The shunting rectifiers 13 and 14 are inserted between the bridge poles. The rectifiers 1 to 14 are arranged in two rows on a platform 15 having an intermediate potential between the earth potential and the high potential bridge pole.

The cathode group of the rectifiers is formed by the rectifiers 1, 2, 5, 6, 9, 10 and 13 whose cathodes are electrically connected to the negative bridge pole. The anode group of the rectifiers is formed by the rectifiers 3, 4, 7, 8, 11, 12 and 14 whose anodes are connected to the positive pole of the rectifying bridge.

In this case the positive bridge pole has a higher potential with respect to the negative one and the lower potential of the negative bridge pole is used as the intermediate potential for the platform 15.

As can be seen from the drawing, the rectifiers 4, 8, 12 and 14 with auxiliary apparatus or equipment thereof whose anodes are connected to the positive pole with higher potential, are located remote from one another at the ends of each row of the rectifiers and are not placed close to each other since transient processes occurring therebetween may give rise to voltages of maximum values between said rectifiers. In conjunction with the abovesaid, the rectifiers 1, 5, 9 and 13 together with the auxiliary apparatus or equipment thereof whose cathodes are connected to the lower potential bridge pole are arranged close to each other since high interacting voltages cannot appear therebetween.

Such an arrangement of the rectifiers 1 to 14 on the platform 15, permits the above when the spacing between the neighboring rectifiers of the bridge and the auxiliary apparatus or equipment thereof does not exceed the minimum size determined by the discharge voltage. As a result, the length of the platform 15 and that both the length and volume of the building adapted to accommodate the converter unit.

What is claimed is:

1. A rectifying bridge for a HVDC power transmission system comprising a plurality of rectifiers connected in two groups in each AC phase in a respective bridge arm thereof, a platform on which said rectifiers are arranged in two rows, said bridge having positive and negative output poles at different potential, the platform being electrically connected to the lower potential bridge pole so as to be at a potential between the higher potential bridge pole and earth potential, the rectifiers at the ends of both rows being electrically connected to the higher bridge pole while the intermediate rectifiers in each row, between the endmost rectifiers, are electrically connected to the platform, the spacing between adjacent rectifiers being at least as great as the minimum spacing to prevent discharge therebetween.

2. A bridge as claimed in claim 1, wherein said rectifiers are arranged in one row with four rectifiers connected to the first phase and three rectifiers to the second phase and in the second row four rectifiers to the third phase, one rectifier to the second phase and two shunting rectifiers.